United States Patent [19]
Bostroem

[11] 4,003,210
[45] Jan. 18, 1977

[54] PIPELINE OF ASSEMBLED FIELD UNITS OF PIPE ELEMENTS AND METHOD OF INSTALLING SAME

[76] Inventor: Theodore Bostroem, 460 Park Road Extension, Middlebury, Conn. 06762

[22] Filed: Dec. 31, 1974

[21] Appl. No.: 537,643

[52] U.S. Cl. .................... 61/105; 138/149; 138/155; 285/223

[51] Int. Cl.$^2$ ............................ F16L 1/01

[58] Field of Search ............ 61/72.1, 72.5, 72.7, 61/46, 36 A, 50; 138/149, 105, 155; 285/223

[56] References Cited
UNITED STATES PATENTS

| | | | |
|---|---|---|---|
| 2,937,662 | 5/1960 | Green | 138/149 X |
| 3,699,690 | 10/1972 | Watter | 61/72.1 |
| 3,734,138 | 5/1973 | Brown | 61/46 X |
| 3,768,547 | 10/1973 | Best | 61/36 A X |
| 3,847,693 | 11/1974 | Ghersa et al. | 138/149 |
| 3,850,714 | 11/1974 | Adorjan | 138/149 |

FOREIGN PATENTS OR APPLICATIONS 1,031,593  6/1958  Germany .................... 285/223

*Primary Examiner*—Jacob Shapiro
*Attorney, Agent, or Firm*—Erich M. H. Radde

[57] ABSTRACT

Self-supporting pipelines, especially useful for installations in arctic and antarctic regions and floating on permafrost even when said permafrost is molten, comprise prefabricated field units of assembled pipe elements composed of pipes enveloped by spaced shells and having within the space between pipe and shell buoyancy-imparting and insulating means such as foamed plastic. Said pipe elements are connected with each other by flexible joints to form the pipeline. The pipelines do not require foundations or piles. The field units can be mass-prefabricated under workshop conditions independently from the weather.

6 Claims, 36 Drawing Figures

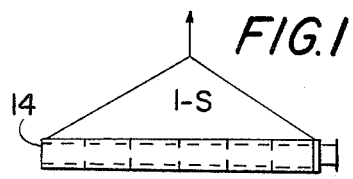
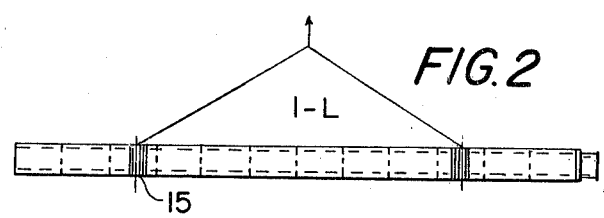
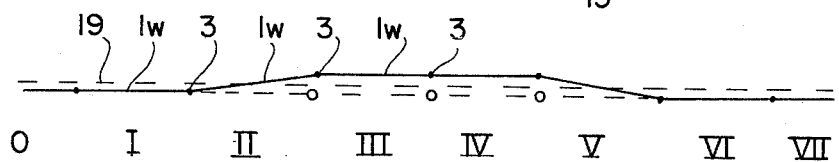
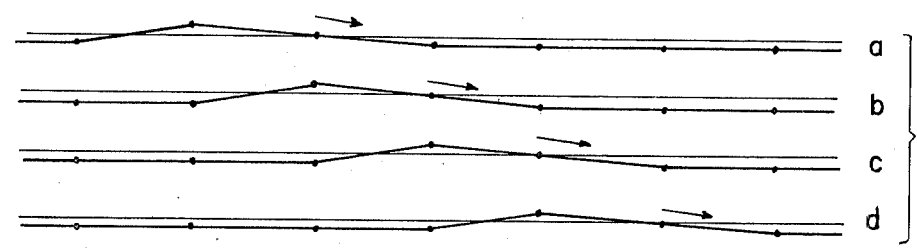
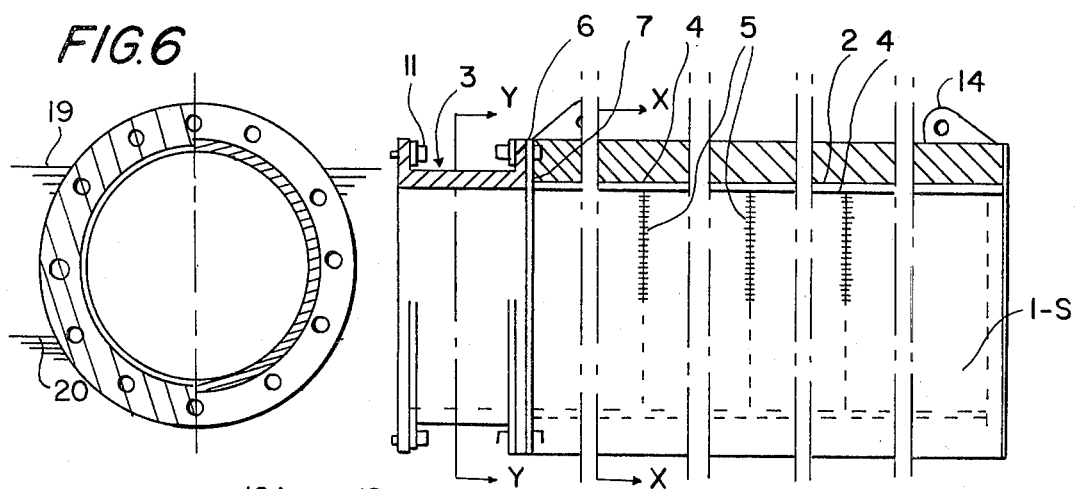
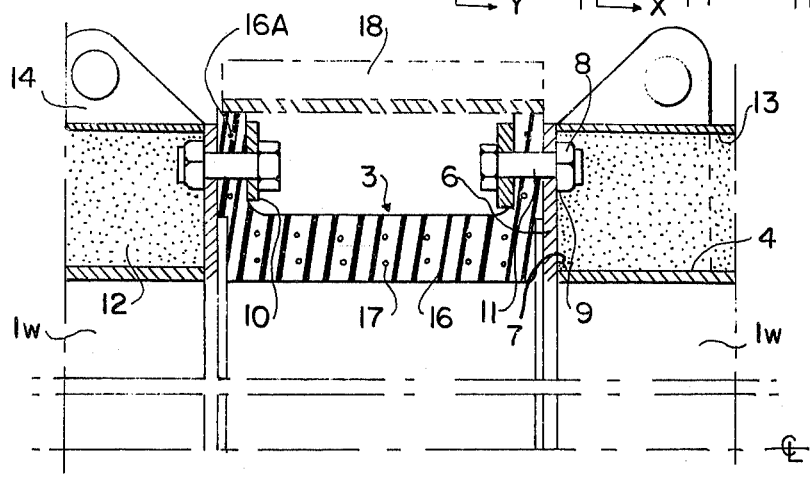

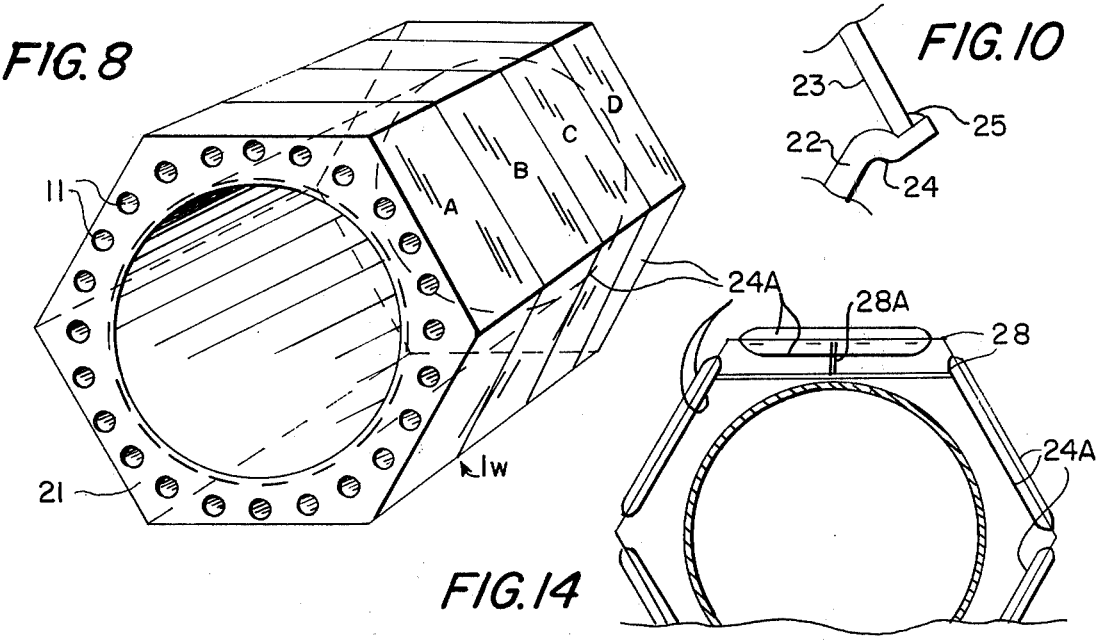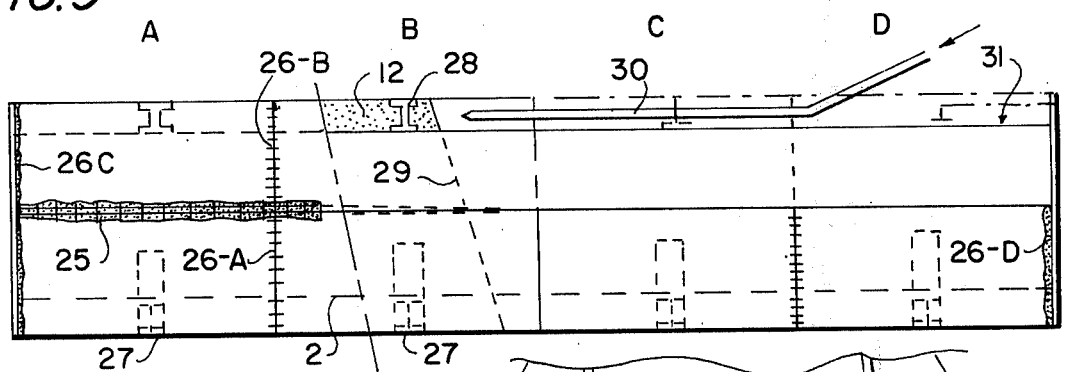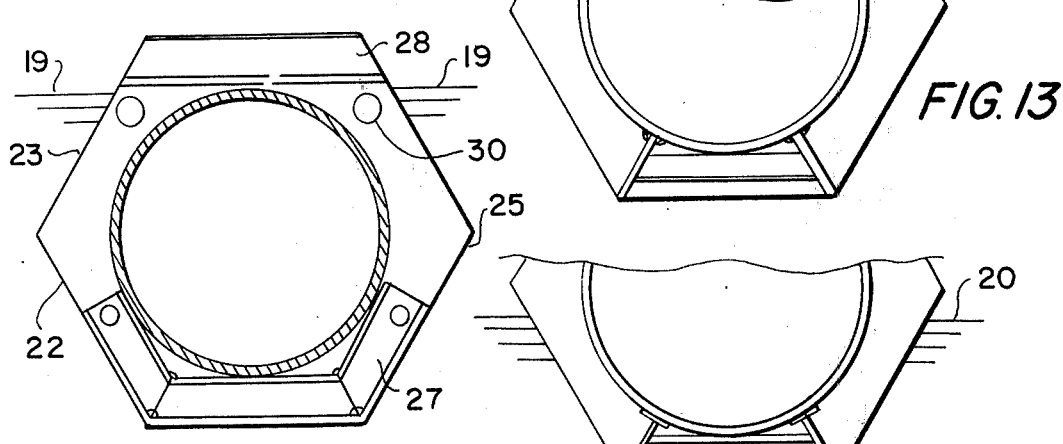

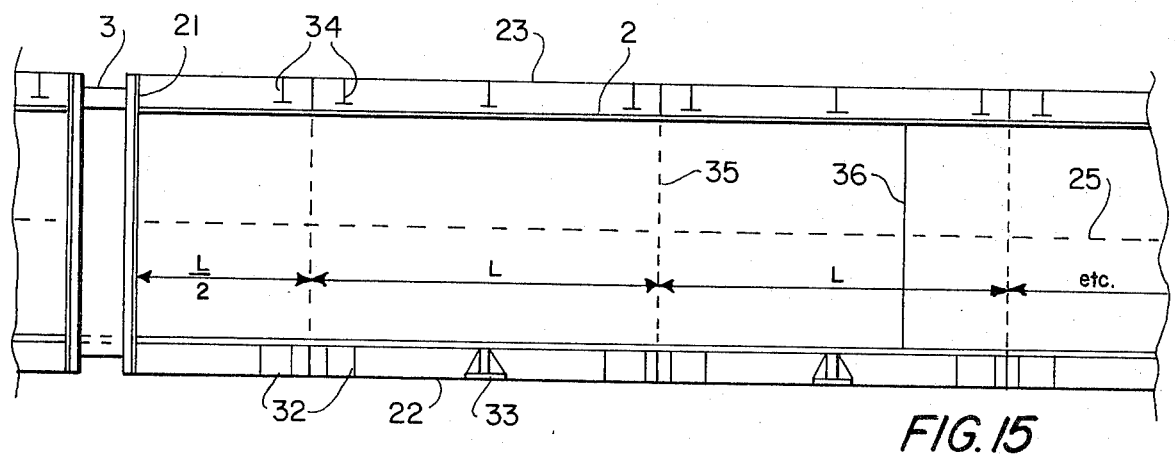
FIG. 15
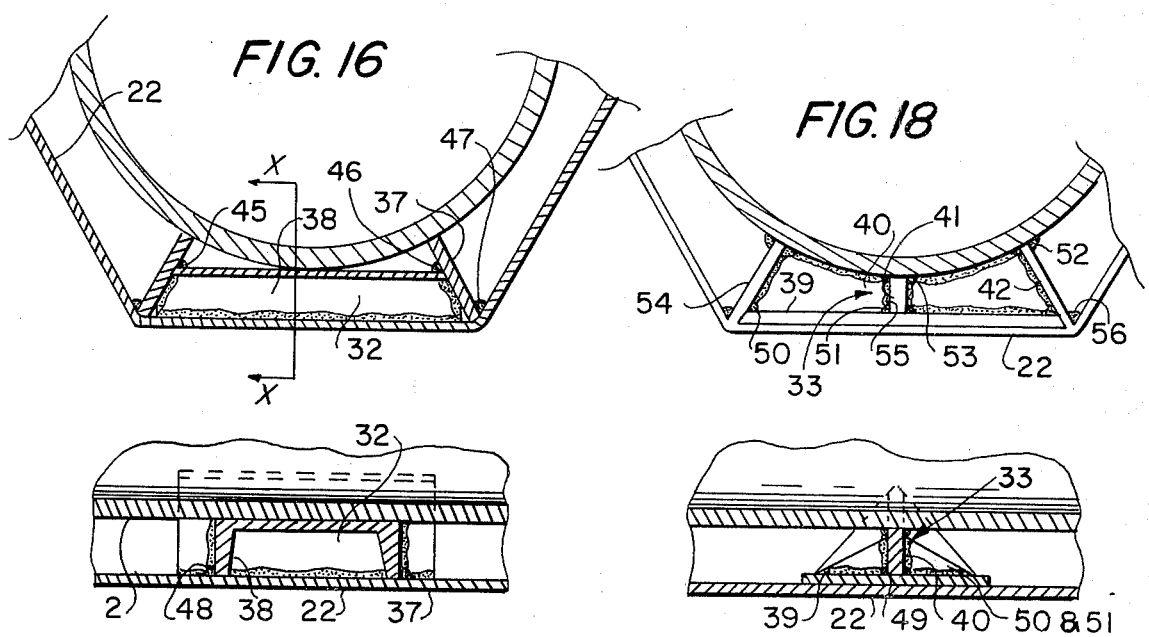
FIG. 16
FIG. 18
FIG. 17
FIG. 19
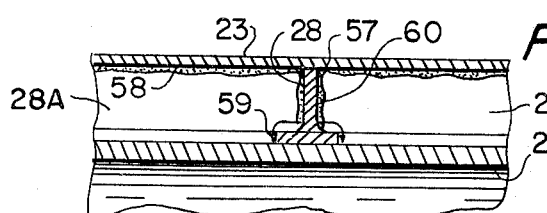
FIG. 20
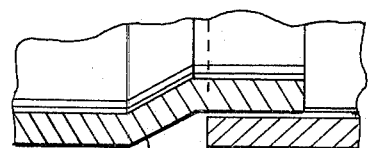
FIG. 22
FIG. 22A
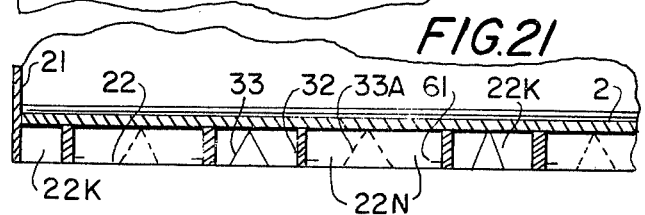
FIG. 21
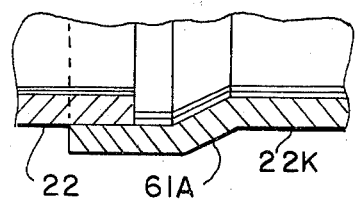

PIPELINE OF ASSEMBLED FIELD UNITS OF PIPE ELEMENTS AND METHOD OF INSTALLING SAME

BACKGROUND OF THE INVENTION

1. Field of the Invention

The present invention relates to a process of laying and constructing oil- or natural gas-bearing pipelines over permafrost soil or sub-soil and more particularly in polar regions, such as tundra land, and to pipes and pipelines adapted to and useful for placing them on permafrost soil or sub-soil.

2. Description of the Prior Art

Large oil and natural gas reserves are available in the polar regions and especially in the arctic regions. However, to get the existing energy to the market represents tremendous problems. Plans of pipelines have been drawn up and construction thereof has been started, for instance, to move crude oil from the Prudhoe Bay to Valdez, Alaska, a distance of 798 miles. A number of other pipelines has been planned or proposed. Most of these pipelines are installed on pilings above ground. For instance, 400 miles of the Prudhoe Bay-Valdez pipeline "will require 88,000 support columns" as pointed out by DEAN HALE in the article on "Pipeline Activity in Full Swing" in the "Pipeline and Gas Journal" July 1974, pp. 27 et seq. "The mere act of drilling the holes for the pilings (it is not feasible to drive pilings in permafrost) and setting them in place to provide the pipe supports, will be a colossal undertaking, unlike any pipeline ever built." The design and building of foundations in polar regions and especially in tundra lands for oil- and gas-carrying pipelines and other equipment are complicated by the fact that tundra is actually nothing else than a frozen bog, extending to considerable depths, known as permafrost.

Unless specific pressures between the foundation and the soil are kept several times lower than those used even in the softest soils, the ice component of the permafrost flows under the load and the foundation sinks with its equipment.

The cost of foundations designed for these conditions becomes prohibitively high, more than the pipeline itself as every cubic yard of material for the foundations has to be transported frequently over many miles of tundra land.

Digging down through the permafrost layer to get to some rock ledge can sometimes mean hundreds of feet and, with few exceptions, is out of question. Even if practically possible, the cost would be prohibitive. Very deep piling has been used, but it has its complications and again, the weight of materials to be brought to the sites entails high costs.

As to laying the pipeline directly onto the permafrost soil, tests have shown that within a short period of time the pipeline will "melt" its way down and will sag critically, creating prohibitive bending stresses in the pipes, finally leading to catastrophic pipe rupture. Indeed, not only the weight of the pipeline when filled with oil, but also the relatively high temperatures required to pump the oil through the pipeline must be taken into consideration because these factors contribute to sinking of the pipeline.

A method has been proposed wherein the pipeline is carried by a layer of insulating gravel, sometimes combined with plastic foam. Unless enormous quantities of gravel and foam are used requiring costly transportation of the bulk of such kind of support, the permafrost gives way and the pipeline will sink beyond control.

Furthermore, constructing the pipeline in the above described manner requires additional construction of haul roads for moving the large amounts of material and equipment required.

SUMMARY OF THE INVENTION

It is one object of the present invention to provide means for a safe support for pipelines traversing permafrost soil and more particularly the tundras, which means do not require the heretofore used supporting means such as pilings etc.

Another object of the present invention is to provide a simple and effective process of laying and constructing pipelines over permafrost soil, for instance, permafrost soil of a tundra, said process avoiding the disadvantages of having to provide the heretofore used costly and expensive foundations for pipelines.

Another object of the present invention is to provide pipes suitable for constructing pipelines to be laid on permafrost soil and especially permafrost tundra soil.

Still another object of the present invention is to provide simple and effective coupling or joining means for coupling and connecting two pipes with each other without having to weld the pipes together, said coupling or joining means being readily attachable to the ends of the pipes and forming somewhat flexible expansion joints between two pipes.

Other objects of the present invention and advantageous features thereof will become apparent as the description proceeds.

In principle the present invention is concerned with providing pipes to be assembled to pipelines for transporting petroleum, natural gas, and other liquid fluids from a source located in the arctics over permafrost soil or sub-soil to a desired collecting, storing, or refining establishment by allowing the pipes composing the pipeline to sink partly into the permafrost liquefied by the heat emanating from the warm oil or gas passing through the pipeline, but to prevent complete submersion in the permafrost by the application of suitable buoyancy means or floats which, attached to the pipes, will prevent the pipeline from sinking fully into the liquefied ice component of the permafrost, so that part of the system (pipe plus buoyancy means) will still be found above the surface of the molten permafrost.

These buoyancy means are either of the "continuous" type and may surround the pipe like a jacket over its entire length or they are separate floaters which are distributed along the length of the pipe. Or a combination of said two types of buoyancy means can be used.

Of course, in either case the specific gravity of the floats has to be lower and preferably considerably lower than that of water so that no excessive volumes of the floats are required. Advantageously the specific gravity of the buoyancy means is between about 0.03 and about 0.20 and preferably between about 0.05 and about 0.1. To achieve this result the buoyancy means or float may be air- or gas-filled or even evacuated hollow bodies. Preferably they consist of a rubber or plastic foam material of light weight which is enclosed by a water and air impermeable covering or is of the integral skin foam type. The light-weight foam buoyancy means are preferably encased by sleeves of low-temperature alloy steel or casings. In place of foam rubber or plastic, such as urethane foam, vinyl foam especially cross-linked vinyl foam, polystyrene foam, low-density polyethylene foam, and others, there can also be used — although less advantageously — cork, sponge, balsa wood, and the like, provided their specific gravity is sufficiently low to carry the pipeline filled with oil or gas.

Providing the pipeline with such buoyancy means, for instance, providing it with a continuous floating jacket, has the further advantage that the heat of the oil pumped through the pipeline is preserved to a greater extent than when using a non-protected pipeline.

A simple way of constructing a "buoyant" pipeline under conditions less difficult than those of the tundra, would be to weld pipe elements of commercially available lengths together, to carry the welded pipes thus formed on appropriate supports, to wind the buoyancy imparting and heat protective material directly or spirally around the welded pipes, and then to lower the buoyant pipes onto the permafrost ground so that they sink and become partially submersed therein when the hot oil is pumped through the pipe line floating on or within the permafrost.

However, manipulating all the equipment required for such a procedure under the open air conditions of the tundra and moving it along as the pipeline "grows" is neither simple nor practical. Besides, some kind of flexible expansion joints has to be incorporated into the pipeline.

According to an especially preferred embodiment of the present invention relatively short pipeline units are produced by welding together several, commercially available "sublengths" of pipes. The resulting units are then provided with appropriate flanges with seals to which suitable flexible joints can be attached. A continuous sleeve, preferably of foam material, is then applied to the pipe units between the extreme flanges, thus forming a "field unit", as explained hereinafter.

The lengths of such prefabricated "field units" may be, for instance, 150 feet to 300 feet for a pipe of an inner diameter of 48 inches.

Prefabricated field units of such a length can readily be transported, for instance, by helicopters from strategically located assembly points to the end of the growing pipeline.

All welding work as well as the application of the foam material is carried out in established work shops under conditions not affected by the weather on the outside and the field units can be moved as soon as the weather permits, for instance, by air lift to their final location.

Unquestionably the favorable working conditions under which the assembly of the field units takes place, will yield better results. Welding control means can be applied far better in the shop than outdoors. Indoor pipe welding can be done with the pipes rotating and the welding head stationary, thus considerably simplifying the welding operation and eliminating formation of the unpleasant "overhead" portion of the weld. As a result thereof, a uniformly perfect weld is achieved under optimum conditions of efficiency and at the lowest cost imaginable.

The buoyancy imparting and heat insulating jacket of foam material can likewise be applied in the shop. This has the great advantage that the temperature conditions required for foaming can readily be controlled. Such a temperature control cannot easily be obtained when applying the foam material outside of a building.

An elastic joint can now be bolted onto one of the above described flanges of one pipe at the work shop. It is even possible to insert the bolts into the opposite flange of another pipe to be joined to the first mentioned pipe by means of the elastic and flexible joint, and the bolts can be held in place in said flange. Thus final joining of the two pipes can be carried out at the site of construction so that field work is reduced to a minimum. Jig positioned nuts can be tack welded onto the inside face of the flange for facilitating field work.

The foam material jacket can be at least locally protected by a relatively thin metallic or plastic sleeve, unless integral skin-type foam is used. For lifting purposes appropriate "ears" extending from the flanges are provided. Such an arrangement, whereby the lifting ears are provided at the end flanges of the field unit, limits its length to about 150 feet for a 48 inch pipe. If field units of a length up to 300 feet are to be installed, such field units cannot be transported to the site of construction by supporting them from their ends due to their becoming bent. Therefore, for instance, carrying belts located at about 20 % and 80 % of the total length of the field units must be provided so as to lift them without bending.

While a pipeline consisting of such bolted together field units may theoretically be more expensive materialwise than a pipeline consisting of simple steel pipes welded together, although the latter would also need expansion joints, elimination of any kind of foundation represents an enormous saving.

On the other hand, the heat insulating foam jacket will very soon pay for itself by reducing fuel consumption for keeping the crude oil at a temperature fit for pumping. The reheating stations can be placed at a much greater distance from each other than when using pipes without foam jackets. This also will result in considerable savings.

The pipeline according to the present invention which is carried by the permafrost in molten condition is quite immune to earthquakes in contrast to pipelines carried by solid supports such as pilings and the like.

Repairs can be effected more readily by replacing the damaged field unit by a spare part and do not require welding in the open field. Since most probably any trouble will occur at the joints, a spare joint can readily be inserted after lifting part of the pipeline out of the molten permafrost. Such lifting is rendered possible due to the arrangement of elastic joints between the field units.

Of course, it is necessary to "unstress" the joint before it is disconnected. For this purpose the two field units which are connected by the joint in question, can readily be lifted out of the molten permafrost in exact alignment, preferably in a horizontal position. This has the further advantage that by locally lifting sections of the pipeline, the oil will flow away from the lifted section, thus facilitating disconnection of the joint to be inspected or replaced.

The pipeline assembly according to the present invention has the further advantage that the oil can readily be removed from the pipeline by successively lifting one field unit after another thus allowing the oil to flow back towards the pumping station and/or into a reservoir. This is not possible in any other system of pipeline support.

Another advantage of providing a pipeline according to the present invention consists in the possibility of readily disassembling and using it at another location, if the necessity arises, after it has served its purpose at the original location.

As mentioned hereinabove, the actual field work is limited to air-lifting the field units to their location and bolting the elastic joint of one field unit to the free flange of another field unit.

The flexible joint which may be a metallic joint or may consist of other materials, may be provided, if desired and/or required, with a protective sleeve placed over the joint.

Since, in general, the field units can be connected with each other more rapidly than when flown, for instance, by helicopter to the construction site, laying of the pipeline can procede with "gigantic strides", i.e. in a small fraction of the time required by any other method or system under the severe conditions of the tundra.

According to an advantageous embodiment of the present invention sliding expansion joints as they are known to the art may be included in the pipeline from time to time. These joints can be connected by means of flanges and bolts to an elastic joint of the field unit.

Although it is preferred to make the pipes and the pipeline of metal and especially of steel, for instance, of special readily weldable, low temperature alloy steel, it is also possible to use re-inforced plastic as pipe material. Plastic material has the advantage that it is partly insulating and the buoyancy and floating of a pipe consisting of such plastic material will be more readily accomplished than when using steel pipes. However, welding or otherwise connecting the commercially available lengths to the final length of a field unit present a problem and, although it could be done with plastic material, it would be more complicated than the welding of steel pipes. In addition thereto a plastic tube field unit must have sufficient strength to resist bursting. For this purpose it must be protected with circular re-inforcing elements. But it must also be provided with longitudinal re-inforcing elements to withstand the bending stresses during lifting and positioning the field units. Furthermore, connection of the steel flanges at the ends of the field units with the plastic pipes presents considerable problems. Thus the costs of such plastic pipelines would be very high. For this reason metal and especially steel is the preferred pipe material.

According to another embodiment of the present invention metallic and especially steel pipes with flanges welded thereon and with ears for lifting the pipes or pipeline field units as they are described hereinabove, are provided with a metallic, preferably steel protective cover for the foam material enclosing the pipes. Said steel protective covering or jacket is made up of two parts, preferably of two halves, namely a top part and a bottom part. Said parts may, for instance, be shaped so that they result in a hexagonal cover of the pipes.

The bottom half of said hexagonal shell or cover may be provided with pipe-carrying brackets which are spaced from each other at a suitable distance and which are positioning the pipe in said bottom trough-like part while the plastic foam is introduced into the system, i.e. the space between the pipe and the hexagonal metallic jacket, after the top part has been attached thereto.

A preferred procedure of assembling the field unit consisting of pipes, bottom part or trough of the jacket and upper part or cover of the jacket, and plastic foam material enveloping the field unit consists in placing the pipe of the field unit with its flanges and ears into the bottom part or trough of the metallic jacket whereby it is spaced from said bottom part by brackets provided therein which carry the pipe. The bottom part is welded together from smaller parts and is welded to the flanges of the pipe. Then a suitable length of the upper part of the jacket, i.e. part of the upper cover which is also preferably in half-hexagonal shape is welded unto the flange of the pipe and also onto the opposite part of the lower trough-like part of the jacket. Preferably simple spacers are provided between the upper part of the pipe and the upper part of the jacket or its covering part so as to maintain the desired space between said covering part and the pipe.

The plastic foam-producing materials, preferably a mixture of a polyalcohol and an isocyanate and preferably a catalyst, foam stabilizer, and blowing agent which are admixed to the polyalcohol are introduced into the space between the pipe and the jacket in a similar manner as this is known for reaction molded urethane foam. Other foam-producing materials can, of course, also be used for filling the space between pipe and part of the covering jacket with foam. If necessary, foaming is promoted by heating the lower part of the covering. Care must be taken that said part space is only partly filled, for instance, only filled by two thirds with the foam and that its open end is kept substantially free of foam. Otherwise it will be difficult, if not impossible, to weld the next section of the upper part of the jacket to the preceding part and to the lower part so as to form another space between pipe and enveloping jacket into which again the plastic foam-producing material is introduced. By proceeding step by step and section by section in this manner, it is possible to finally envelope the entire length of the respective pipeline field unit with the foam material between its protective, preferably hexagonal cover and the pipe. The last section of the upper part of the protective cover is welded to the end flange of the field unit. Thereby either said last section or the end flange is provided with an opening through which the foam-producing material is introduced.

To avoid overheating of the foam-producing material when welding the next section of the upper part of the protective envelope to the preceding part and the lower part thereof it is advisable to effect welding at a certain distance from the foaming material, for instance, at a distance of about 3 feet by not completely filling the entire space between upper and lower part of the jacket and the pipe. This has the further advantage that the welding heat will cause prompt reaction and foam formation. Some plastic foams are formed by exothermic reaction. They require only a small amount of additional heat which is readily supplied by welding.

It is to be pointed out that one of the advantages of the half-hexagonal form of the foam protective jacket is its ability of fitting one into the other when placed upon each other. Thus the space occupied by said trough and cover parts of the jacket is reduced to a minimum thus facilitating considerably their transportation. Of course, the pipe flanges can also be of hexagonal shape when providing a foam protective jacket of hexagonal cross-section.

Another advantage of a foam-protective jacket as described hereinabove is that if voids are formed between consecutive sections of foam material, such voids will only make the field unit lighter and provide even more buoyancy, since water is excluded from the welded structure.

While formation of the above described "troughs" and "covers" can be performed by conventional butt welding, the welded connection between the trough and the cover can consist of a kink or bend provided at the edge of the trough which engages the edge of the cover. A very rapid "top" weld of the joint between trough and cover can then be performed with minimum heating of the surrounding material.

Another advantage of the hexagonal form of the jacket consists in its bottom being flat-shaped thus producing comfortable contact between the pipeline and the tundra soil. The flat surface of the top of the jacket permits walking thereon, especially in view of the fact that the buoyancy of the floating pipeline will easily support one or even several men for carrying out any required preparatory or maintenance work. Likewise it is very easy to install bridges over said flat-shaped cover so as to allow wild animals or even humans to cross the pipeline.

Still another advantage of the substantially rigid hexagon-shaped, foam material-protecting shell or jacket is based on the following consideration:

When hot oil flows through the pipeline according to the present invention, the buoyancy of the foam material protecting jacket keeps the line about one-tenth of its section area above the water level and about nine-tenths of it submerged. When, for any reason, the oil is removed from the pipeline, the latter will float in the water at a much higher level than when it is full.

Therefore, the buoyancy of the pipeline is to be calculated and the pipes with foam envelope and protective shell be designed so that the water level for an empty pipe is somewhat below the cross-sectional center line of the hexagon-shaped jacket, i.e. where the wall of the jacket extends by 60° outwardly with regard to the pipe, on both sides of its center line.

Then, if the media into which the pipeline is partly immersed freeze due to lack of heat of the flowing oil and thus exert pressure against the sloping walls of the hexagonal shell, this pressure will push the pipeline upwardly. As a result thereof, the pipeline will not be crushed by the pressure exerted by the freezing medium.

According to another embodiment of the present invention construction and assembly of the hexagon-shaped jacket or shell surrounding the pipe may be effected in the following manner so as to take care of intensive stress forces to which the pipe and its shell are exposed under the influence of changes in the surrounding temperature in the field. When assembling the pipe line field units in the workshop, the temperature to which the various parts, pipes, flanges, pipe supports within the shell or jacket, and the shell are exposed, will be substantially the same. However, in the field the pipeline will be in contact with the warm oil flowing therethrough and thus its temperature will be higher than that the surrounding media i.e. frozen or fluid tundra soil or permafrost. Due to these differences in temperature compression stresses will be created in the pipe and tensile stresses in the shell, said stresses being inversely proportional to their respective cross-sectional areas.

Therefore, the strong peripheral welds between troughs and covers are replaced by positioning tack welds, while the longitudinal welds between troughs and covers are maintained. As a result thereof relatively short sleeve shells positively fixed in their mid-length to the pipe body are formed and the ends of these shells while correctly located radially with regard to the pipe, are free sliding in the direction of the axis of the pipe. When the pipe expands from heat, the relatively short shells will remain evenly distributed over the length of the pipe elements and the field units, i.e. the pipe elements and their elastic joints.

According to a modification of this procedure solid plastic skin which may or may not adhere to the foam material is formed over the latter. This plastic skin or envelope will prevent water from entering the foam material. When constructing the pipeline accordingly, it is very easy to prevent water from getting between adjacent parts of the foam-filled shells simply by using plastic or rubber belts binding and sealing each pair of shells.

To increase the stiffness of the faces of the hexagonal shell parts, it is preferred to provide them with embossed ribbing transverse to the axis of the hexagon. Such a positioning of the ribbing will not prevent that the empty pipe line is pushed upwardly as described hereinabove.

A preferred procedure to assemble field units of the pipeline according to the above described embodiment of the present invention is as follows:

1. Pipe sections of commercially available lengths are welded together and to the hexagon-shaped end flanges to which nuts have been previously attached.

2. Central fixed supports for the pipe which are preferably located at the mid-lengths of each shell section, are then welded to the pipe at its proper places.

3. The bottom sections of the shell, i.e. the troughs are aligned in contact with each other and end supports, if provided, are welded to the troughs.

4. The welded pipe with its flanges is now placed into the aligned troughs, where it is carried by the fixed central support and may rest on the end supports welded to the troughs, whereupon the central supports can also be welded to the troughs.

5. If metallic or plastic separators are provided between the foam material of each shell, they are now placed opposite the junction of the shells. In this case any longitudinal welding is preferably effected before the foam producing agents are introduced. The foam producing agents are then introduced into the upper or covering parts of the shell or jacket through appropriate holes preferably in the horizontal parts of the cover parts.

6. Said upper or cover parts which preferably are re-inforced by the provision of stiffening and carrying means serving to support said parts on the upper surface of the pipe or by having embossed ribs are then placed on their corresponding troughs and the troughs and the covers are longitudinally welded to each other. If no separators are provided between shells, the longitudinal welds can be effected gradually, i.e. simultaneously with the introduction of the foam producing agents.

Such a construction does not create high tensile stresses in the foam protecting shell when the pipeline is heated by the hot oil passing therethrough. Accordingly the shell is constructed in short length sections and each shell section is attached to the pipe substantially at a middle distance from the ends of the shell element. In operating conditions, when the pipeline is laid on permafrost tundra soil, the shells remain substantially unchanged whereas the pipe will expand under heat. Whereas the foam material should preferably be adherent to the pipe body, the foam should, at least towards the end portions of the shells, be slidable within the interior of the shells. Otherwise the gap occuring in between the shells will be tearing apart the foam material opposite the gaps. In order to minimize the effect of the uneven expansion of the pipe proper and of the shell or shells, it is suggested to pre-heat the pipe during formation of the foam material to a temperature between the temperatures to which the different parts of a field unit may be exposed in actual use. For instance, if the lowest outside temperature is −65° F. and the highest temperature of the oil flowing through the pipe is +185° F., i.e. if the maximum difference in temperature is 185° F. + 65° F. = 250° F., it is advisable to pre-heat the pipe during formation of the foam material to about one half of the maximum temperature difference of 125° F. above the workshop temperature which may be about 70° F., i.e. to pre-heat the pipes to about 195° F.

As a result of this pre-heating procedure during manufacture of the field unit the maximum stresses encountered in the foam material due to unequal temperatures of pipe and shell or shells will be reduced to about one half of the stresses encountered when foam is formed in a non-pre-heated pipe (or a non-pre-cooled shell or shells).

According to such an embodiment of the present invention no "peripheral" welds are effected between the shells. However, it is desirable to weld the two extreme shells to the hexagon pipe flanges. In this case, in order to limit the stresses to which the shell metal is exposed, to a uniform value, the two extreme shells welded to the flanges are preferably only half as long as the other shells. Welding the shells to the flanges may replace the fixed pipe and trough supports otherwise provided in the middle of the shells, and only one "sliding support" need be used.

According to another embodiment of the present invention there are provided between the pipes, when assembling the pipeline, commercially available expansion joints. While such expansion joints may be quite adequate under ordinary climatic conditions, they may not be suitable under the extreme temperature variations of the arctic or antarctic where the temperature varies between minus 60° F. and the hot oil temperature which can be plus 190° F., i.e. a variation of 250° F. Selection of suitable sealing materals for such standard expansion joints may also cause great difficulties.

According to the present invention a U-shaped pipe expansion joint is provided which will compensate for any expansion or contraction of the main pipeline by the use of a single additional element to those employed in the construction of a field unit, namely an elbow-shaped element constructed similarly to a field unit. Such elbow elements are preferably constructed as follows:

A flange-less cast steel or welded up elbow is welded to two premachined flanges, carrying the welded-on nuts, as described hereinabove for the flanges of the field units. Suitable half hexagon-shaped angular plates are premanufactured and welded together to form a hexagonal shell to envelope the pipe elbow. Such a shell can be welded — but need not be welded — to both pipe flanges and the space between pipe elbow and surrounding shell can be filled with the plastic foam.

The U-shaped expansion joints may be assembled in the following manner:

1. Starting at the last flexible joint of the pipeline there are successively provided:
   an elbow,
   a flexible joint,
   a field unit which preferably is shorter than the usual field units,
   again a flexible joint,
   an elbow,
   a flexible joint,
   an elbow,
   again a field unit as above connected to the elbow by its flexible joint,
   a flexible joint,
   an elbow and
   the flexible joint of the continuous field unit of the main pipeline.

Obviously such as construction is quite complicated.

2. According to another embodiment it is possible to eliminate four flexible joints. In this case there are successively provided starting at the last flexible joint of the pipeline:
   an elbow,
   a straight pipe or field unit,
   an elbow,
   a flexible joint,
   another elbow,
   again a straight pipe or field unit,
   an elbow, and
   the flexible joint of the continuous field unit of the main pipeline.

Such an expansion joint, of course, will not be as flexible as the expansion joint described under (1), but it will be simpler to construct. The loss in expansion may be compensated for by making the straight pipes somewhat longer than in the expansion joint under (1). Although such an expansion joint is somewhat simpler to construct, welding of the elbows to the straight pipes so that they form an S-shaped structure will be more difficult because it requires a modified rotating welding fixture.

3. Instead of using 90° elbows in the expansion U-joints described hereinabove under (1) or (2), there may be made use of the "zig-zag" method of compensating for expansion and contraction of the pipeline. For this purpose modified field units each composed of a straight pipe length and a pipe elbow, all enclosed by their respective hexagon foam-filled shells, are connected by flexible joints or even rigid joints. Rigid joints are used particularly for pipelines under very high pressure. Such expansion joints are used in a self-supporting zig-zag type oil pipeline.

Prefabricated field units according to the present invention can still be constructed regardless which angle of the zig-zag arrangement of the pipeline is selected and by which method the pipes are connected in such zig-zag fashion, i.e. whether they are connected rigidly or flexibly.

A preferred and practical "turn" of the zig-zag is a turn at an angle of 45°. A pipe elbow of an angle of 45°, whether it is made of a steel casting or is produced by welding, can be obtained much simpler than a 90° elbow.

When providing shell sections freely sliding in the direction of the axis of the expanding or contracting pipes as explained hereinabove, every other shell may be made slightly larger than "normal", so as to allow a slight overlap of the "even" shells over the "odd" ones. This could be done by either increasing the even hexagons by an amount equal to the thickness of the shell material or, having all shells of similar dimensions, provide for marginal kinks which could be overlapped by the non-kinked edges of the non-kinked shells. In such a design it is possible to completely omit the end sliding supports of the non-kinked shells (in view of the limited widths of the shells) and, if the kinked design is used, omit even the central fixed supports of the non-kinked shells.

The advantages of constructing and laying the pipeline directly onto the tundra permafrost soil according to the present invention may be summarized as follows:
1. No foundations or piles are required.
2. The pipeline is mass-prefabricated in relatively short sections, i.e. field units, which can be produced under workshop conditions while working full time, regardless of the weather, and the field units can be stored. Weather permitting, the field units are transported to the site and are connected, for instance, by bolt fasteners to the last link of the growing pipeline.
3. This method permits to use a simple, powerful welding method, thus reducing the welding time to between one-half and one-third of that required by the presently used method and producing an improved weld. This is due to the fact that the limited pipe lengths can be rotated and Heli-Arc or submerged arc welding methods can be used under shop conditions, while presently outdoor "Automatic Guidance (AGS) Systems" must be employed whereby the welding machine turns around the stationary pipe.
4. The method further permits to form the insulating foam material likewise under shop conditions by using the pipe itself and an outer protective shell as a perfect mold for the foam material. Thus fitting of the foam to the pipe and to the shell is eliminated and the bulk of foam is reduced many times so as to facilitate transportation to the pipe laying site.
5. Minimum outdoor work is required, namely picking up the field units at the shop, transporting them to the pipe laying sites, aligning them with cranes, and bolt-connecting them to the growing pipeline.
6. The bulk of the finished field units is only about 60% greater than that of the 48 inch pipe alone, calculated for a pipe wall thickness of five-eights inch.
7. The earthquake hazard is greatly reduced because the pipeline is so to say "waterborne".
8. The whole pipeline can readily be relocated to a new site when the original oil field has been exhausted.

BRIEF DESCRIPTION OF THE DRAWINGS

The attached drawings illustrate the present invention but do not limit the same thereto. In said drawings, FIG. 1 shows a typical "short" field unit carried by its ends:

FIG. 2 shows a typical "long" field unit which is too flexible to be carried by its ends and thus is provided with appropriate belts which support this type of field unit;

FIG. 3 diagrammatically shows the possibility of lifting the pipeline in order to inspect or replace a damaged joint.

FIG. 4 in positions a, b, c, and d shows a method of emptying the pipeline by progressively lifting successive parts of it.

FIG. 5 shows a longitudinal half-section of a field unit in its upper part and an elevation in its bottom part.

FIG. 6 shows two half-sections of the field unit of FIG. 5, namely the left half cross-section taken at X—X of FIG. 5, while the right one is taken at Y—Y of FIG. 5.

FIG. 7 shows a longitudinal section of an elastic joint connected to two field units at an enlarged scale with respect to that of FIG. 5, said FIG. 7 illustrating the lifting ears used with the short field units, as they are used for transporting such units to the sites of construction of the pipeline.

FIG. 8 shows, in perspective view, a pipeline (i.e. without elastic joint) with its hexagon flanges and with foam material protected by a hexagon prismatic sleeve composed of four panels A, B, C, and D of smaller length.

FIG. 9 is a side view of such a pipeline element in partial section.

FIG. 10 is a sectional view of the joint before longitudinally welding together of "trough" and "cover" of the shell.

FIGS. 11, 12, 13, and 14 are cross-sectional views of a pipeline element according to FIG. 9, showing various supports of the pipe in the bottom part of the shell, i.e. the trough, and a support of the top part of the shell, i.e. the cover, on the pipe.

FIG. 15 is a longitudinal sectional view diagrammatically showing an end portion of a field unit of the design in which the foam-protecting sleeve is subdivided into shorter shell sections.

FIG. 16 is a cross-sectional view at a larger scale than FIG. 15 through an end support of the pipe in the shell.

FIG. 17 is a longitudinal sectional view at X—X of FIG. 16.

FIG. 18 is a cross-sectional view and FIG. 19 a longitudinal sectional view of the central, fixed support of the pipe in the trough, i.e. the bottom half of the shell.

FIG. 20 is a cross-sectional view of the cover, i.e. the top part of the shell, showing the sliding contact of the cover reinforcing T-pieces on the pipe.

FIG. 21 shows the shell support provided in kinked overlapping shells in longitudinal diagrammatic sectional view of the lower part of the pipe.

FIGS. 22 and 22A are enlarged views of the kinks of the bottom half-hexagons of the shell, i.e. of the troughs showing inner and outer kinks of the shell sections.

FIG. 23 illustrates an expansion joint using five flexible joints.

FIG. 24 illustrates an expansion joint using "S"-shaped pipes and shells.

FIG. 25 illustrates an expansion joint in which four of the flexible joints of FIG. 23 are replaced by simple couplings bolted to the pipe and shell elbows.

FIG. 26 shows the S-shaped pipe used in the expansion joint system of FIG. 24, whereas FIG. 27 shows the S-shaped pipe used in the expansion joint system of FIG. 24 but with the additional "dead" flanges for better positioning of the shell around the pipe.

Like numerals in the drawings represent like parts therein.

DESCRIPTION OF THE PREFERRED EMBODIMENTS

Figure 23:
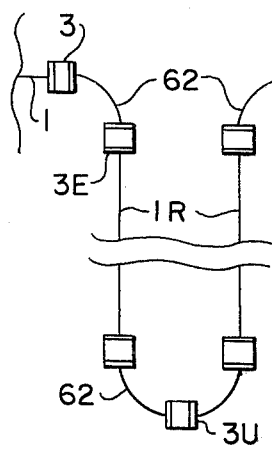
FIGS. 23, 24, and 25 show diagrammatically the various ways of constructing expansion "U" joints by using elbows of pipes and shells especially made in accordance with the principle according to which the field units are constructed, said expansion U-joints using flexible joints and preferably shorter field units.

FIGS. 1 and 2 represent assembled pipe field units. As stated above, FIG. 1 shows the short-type field unit 1-S and FIG. 2 the long-type field unit 1-L. Means 14 for lifting the field units, for instance, ears for hook-lifting are provided at the ends of the short-type field units 1-S of FIG. 1 and means 15 at appropriate places at a suitable distance from the ends of the long-type field units 1-L of FIG. 2.

The Roman numerals on FIGS. 3 and 4 designate successive field units of the pipe line. These Figs. illustrate the manner in which the pipeline is lifted out of the melted permafrost either, as in FIG. 3, for inspecting and/or replacing a specific field unit 1 and/or an elastic joint 3 between field units or, as in FIG. 4 for completely emptying the pipeline, if necessary. Dotted line 19 represents the surface level of the molten permafrost around the floating pipeline when it is filled with oil. Position a in FIG. 4 shows the highest point of the lifted pipeline between field units I and II. As soon as the oil has run out of that Section I/II, unit I may be lowered back into the molten permafrost and field units II and III are lifted so that the joint between said units II and III becomes the highest point, as shown in position b of FIG. 4. After the oil in the pipeline has run out from field units II and III, successive field units III and IV, IV and V, and so forth are lifted and replaced as shown in positions c and d of FIG. 4. In this manner it will be possible to completely drain the pipeline of its oil in the direction of the arrow. In this manner any spillage of oil can be avoided, because the pipe field units need not be removed while the pipeline is still filled with oil.

In FIG. 5 a number of pipes 4 of commercial length are welded together to pipe element 2 at the welds 5. Flanges 6 are connected to pipe element 2, i.e. to the end pipes by welds 7. Lifting ears 14 are welded to pipe 4 and/or flange 6. Nuts 8 are tacked onto the inner face of flange 6 opposite corresponding holes in said flange 6. Weldment 2A has been formed. Bolts 11 are clamping together ring-plate 10, flange 16a of elastic joint assembly 3, and flange 6 of pipe weldment 2A.

FIG. 6 shows in cross-sectional view two half sections of a field unit. In this Fig. the surface level of the molten permafrost is indicated by 19 when the pipeline is filled with crude oil and by 20 when the oil has been removed, i.e. the pipeline is empty. The left half of said FIG. 6 is a cross-sectional view through field unit 1W along the line X—X of FIG. 5 while the right half thereof is a cross-sectional view along the line Y—Y of FIG. 5. Foam material jacket 12 is provided about pipe element 2 for buoyancy and heat insulation. Said foam jacket 12 is protected by outer shell 13.

FIG. 7 illustrates more in detail the arrangement of an elastic, flexible expansion joint 3 between two field units 1W. As in FIGS. 5 and 6, the end of pipe 4 is welded to flange 6 by welds 7 with nuts 9 tackwelded to the inner face of flange 6 facing corresponding holes in said flange 6. Foam material 12 and outer shell 13 envelop pipe element 2. Ear 14 for hook-lifting is attached to pipe 4 and flange 6. Expansion joint assembly 3 consists of elastic material 16 with flange-like extensions 16a through holes of which clamping bolts 11 are passed. Expansion joint 3 is provided with protective sleeve 18. Size and number of clamping bolts 11 depend, of course, upon the diameter of the pipeline, the pressure under which the oil is pumped therethrough, and on the necessity of effecting oil-tight contact between flanges 6 and flange-like extensions 16a of expansion joint 3. The number and size of the reinforcing rings, spirals, or other means 17 is determined also by the necessity of the expansion joint to withstand the pressure of the oil in the pipeline, without, however, interfering with the elasticity of the joint.

Protective sleeves 18, clamped onto the outside edges of flanges 16a of the elastic joint 3, can be arranged so that they provide extra buoyancy if the clamping is kept on the upper part of the system.

Sleeve 18 can be made of metal or plastic material.

FIG. 8 illustrates, in perspective view, a preferred and advantageous shape of the shell surrounding the enveloping foam material and the pipe. As pointed out hereinabove, the hexagonal shape of said shell has many advantages. FIG. 8 shows that the shell may consist or several panel sections designated by A, B, C, D, which cover round pipe element 2. As is evident from said FIG. 8, several panels of the hexagonal shell are provided. These shell sections are provided with reinforcing and positioning means as they will be described hereinafter in connection with the subsequent drawings. Flange 21 is welded to the pipe and may also be welded to the first and last shell sections A and D. Preferably flange 21 is of the same size and shape as the shell envelope. However, it could also be somewhat larger. Bolt holes for clamping bolts 11 for fastening flanges 21 to flexible joints 3 (see FIGS. 5 and 7) are also shown. The shell sections A, B, C, and D consist of trough parts 22 and cover parts 23.

FIG. 10 shows a preferred way of connecting trough part 22 with cover part 23 of the shell. The edges of trough part 22 are bent to provided kink 24 and the edges of cover part 23 are welded thereon by longitudinal welds 25 in a rapid and simple manner to yield a light and safe weld. Of course, other ways and means of connecting trough parts 22 and cover parts 23 of the shell may also be employed.

In FIG. 9 pipe 2 is supported in trough part 22 by supports 27 which are tack welded to said trough part 22. In the illustrated field unit 1W the shell is composed of four sublengths A, B, C, and D which are supported by the four pipe supports 27. Likewise four cover supports 28 which can also serve as stiffening ribs for the cover parts 23 as shown in FIG. 14, are provided.

Trough parts 22 and cover parts 23 are welded to each other as shown in FIG. 9 by longitudinal weld 25, while welds 26a and 26b connect the sublengths of trough parts 22 and cover parts 23.

As is evident from FIG. 9, trough part 22 and cover part 23 of section A have been welded to each other and by weld 26c to hexagon flange 21. The space between the part of pipe 2 enveloped by the shell A formed by said trough and cover parts 22 and 23, is filled with plastic foam. Section B of FIG. 9 shows one way in which foam is introduced into the space between pipe 2 and shell section B enveloping pipe 2. The foam forming material 12 is introduced into said space by means of one or several lances 30 depositing it thereinto. Thereby foam 12 forms slope 29 within said space during its formation. By more and more withdrawing lances 30 during introduction of the foam forming material, sections A, B, and C are successively filled. The last section D can be filled with foam through manhole 31 after withdrawing the lances.

FIGS. 11, 12, 13, and 14 show in cross-sectional view the construction of the pipe supports 27 in the trough parts 22 of the shell (FIGS. 11, 12, and 13) and that of the cover supports 28 and 28A in the cover parts 23 of the shell (FIGS. 11 and 14). As shown in FIG. 11 carrier 28 in the form of an I-beam is preferably welded to the horizontal part of the cover at right angles to the general direction of the pipe and thus forms a substantial stiffener for cover parts 23. Said cover carrier 28, as shown in FIG. 14, can be completed by a longitudinal beam which, even if of only light section, results in substantially increasing the carrying capacity of the horizontal part of cover part 23 so that heavier loads can be carried by said cover part.

FIG. 11 shows a support 27 of pipe 2 in trough part 22, said support being a weldment composed of a burned- bent- and-welded structure which is tackwelded to trough 22 and holds pipe 2 on an 120° angle. The thickness of the foam material 12 in the space between trough part 22 and pipe 2 equals the height of said beam.

Pipe support 27 in FIG. 12 is composed of a weldment which is welded to trough part 22 but holds the pipe only on a 60° angle. In contrast thereto, the pipe support 27 as shown in FIG. 13 consists of plates with stiffeners welded to the pipe itself, the plates taking support at the two bottom angles of the trough.

While FIG. 9 shows only one set of stiffener-supports 27 for each of the shell panels A, B, C, and D of FIG. 9, the panels can also be several yards (meters) long. In this case it is advantageous to provide at least two such stiffener supports 27.

Several openings for introducing the foam-forming material 12 into and for filling the hollow space between pipe 2 and the hexagon shell with foam can be provided after all weldments have been completed. However, such openings require corresponding closures and, besides, afford but a very restricted control over the foam-filling operation. Therefore, as described hereinabove, the preferred procedure is as follows.

The required number of commercially obtainable pipe lengths 4 are welded together to form pipe 2 and two flanges 21 are welded to their ends (welds 7 of FIG. 7).

Appropriate lengths of trough parts 22 are welded together. The required pipe supports 27 are placed in position and welded to trough parts 22 as shown in FIGS. 11 or 12. Or they are welded to pipe 2 as shown in FIG. 13. The ends of trough parts 22 with pipe supports 27 are welded to the hexagon pipe flanges 21.

Stiffeners 28 are welded onto cover parts 23.

Cover part 23 of shell "A" is placed onto trough part 22 of shell element A and one end of cover part 23 is welded to hexagon pipe flange 21 (weld 26c).

Cover part 23 and trough part 22 of shell element A are then welded together longitudinally forming welding seam 25.

The thus created hollow space A between pipe 2 and shell section A is then filled, for instance, up to one yard (one meter) ahead of the free end of shell section A with the foam material.

Cover part 23 of shell panel "B" is then placed on pipe 2 extending from shell section A and on through part 22 of said shell panel B.

Cover part 23 and trough part 22 of shell section B are welded to shell section A and are welded together at longitudinal seam 25.

Foam-forming material is introduced into the space between pipe 2 and cover and trough parts 23 and 22 of shell section A to completely fill the same and into the corresponding space of shell section B up to about one yard (one meter) from the open end of said section B.

FIG. 9 illustrates this step of the foam introducing procedure showing lance 30 and foam material sloping at 29.

The procedure is the same for joining additional shell panels C and, if required, more panels.

The last shell panel (panel D in FIG. 9) is connected to the preceding panel (panel C in FIG 9) by placing cover part 23 of shell panel D on pipe 2 resting on trough part 22 of panel D and welding said cover part 23 to the corresponding cover part 23 of panel C.

Cover part 23 and trough part 22 forming shell panel D are then welded to hexagon pipe flange 21 which is attached to pipe 2 by weld 26d.

Finally cover parts 23 and trough part 23 of shell panel D are joined to each other by welding at welding seam 25.

The foam-forming material is introduced into the empty part of shell panel C and into shell panel D through manhole 31 which, after filling panel D completely, is either permanently sealed by screwing a manhole cover thereon or which is fluid-tightly sealed by welding thereon the manhole cover.

It is evident that lance 30 must be of a length somewhat longer than the longitudinal extension of the cover part 23, so that the empty end part of the preceding shell section can readily be filled with foam-forming material.

In FIG. 15 there are provided in trough part 22 sliding end pipe supports 32 for pipe 2 while preferably fixed central pipe supports 33 are inserted at an approximately equal distance from the ends of trough part 22. Likewise, corresponding sliding supports 34 are provided in cover parts 23. The pipe lengths 4 are welded together at weld 36 forming a pipe element 2. But the various pipe lengths need not be related to the lengths of the shell panels formed by cover parts 23 and trough parts 22. Gaps 35 may exist between consecutive shell sections. Each shell section thus is composed of relatively short lengths of a trough part 22 and a cover part 23 which comprise two end pipe supports 32, if required, a fixed central pipe support 33, and two or three reinforcing cover supports 34. The upper half-hexagon of the shell, i.e. the cover part 23 is welded longitudinally to the lower half-hexagon of the shell, i.e. the trough part 22 along weld 25 as shown in FIGS. 9 and 11.

Sliding end support 32 as shown in FIGS. 16 and 17, is composed of two rectangular plates 37 and channel part 38 which are welded together by welds 45 and 46. Plates 37 are welded to trough part 22 by weld 47 while channel part 38 is welded to trough part 22 by weld 48. Pipe 2 is simply supported by the edges of plates 37 and by the back of channel part 38.

Fixed central support 33, as shown in FIGS. 18 and 19, is composed of base 39. Web 40 is welded thereto (weld 49), stiffened by six ribs 41 and 42, welded to the base 39 by welds 50 and 51, welded to pipe 2, welds 52 and 53, welded to web 40, welds 54 and 55. All these welds (49 to 55) are performed before pipe 2 is put into trough part 22, i.e. the fixed central support 33 is welded to pipe 2. After the trough part 22 is correctly placed under the pipe, welds 56 are made, thus permanently connecting said pipe 2 with said trough part 22.

As shown in FIGS. 15 and 20, reinforcing supports 34 of cover part 23 are made of cross T-beams 28 welded to cover part 23 by welds 57 with longitudinal T-beams 28A welded to cover part 23 by welds 58. The two T-beams 28 and 28A are welded together by welds 59 and 60. The two T-beams 28 and 28A are not firmly connected to pipe 2, thus permitting relative movement when pipe 2 is heated up by the oil flowing therethrough.

The upper edges of plates 37 as well as the back of channel part 38 will also permit relative movement of sliding supports 32 when changes in temperature, although quite rarely, take place. For a better understanding of the structure of the pipe supports, the foam material has been omitted in the drawings.

In FIG. 21 showing a longitudinal section of the lower part of a pipe and its shell, the trough 22 is composed of kinked trough parts 22K, of kinked half trough part 22KK welded to hexagon flange 21, and of non-kinked trough part 22N. Kinked trough parts 22k support at their ends part of main pipe 2. The position of kinked trough parts 22K with respect to pipe 2 is fixed by median supports 33. Non-kinked trough parts 22N are not provided with end supports. Their central supports 33A are shown in dotted lines to indicate that they can be omitted.

FIGS. 22 and 22A show, in about actual size, the end of a kinked trough part 22K, the kink thereon 61, and the beginning of a non-kinked trough part 22. Of course, kink 61 can be made so as to protrude outwardly of the general line of the shell as shown in FIG. 22A, or inwardly as shown in FIGS. 21 and 22.

The upper cover part 23 of the shell can be constructed in a similar manner with kinked cover parts 23K, kinked half-cover part 23KK, and non-kinked cover part 23N.

FIG. 23 shows a pipeline expansion joint with normal flexible joints 3 of the field units 1 with combined pipe and shell elbows 62, elastic joint 3U providing flexibility of the expansion joint in combination with said flexible joints 3. Reduced length field units 1R and flexible joints 3E in combination with elbows 62 and elastic joints 3U eliminate the necessity of specifically producing S-shaped pipes and shell elements as shown in FIGS. 26 ad 27.

Figure 24:
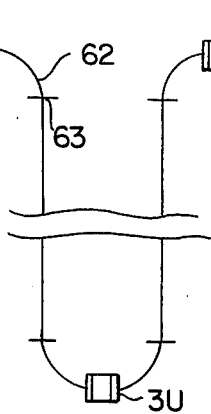
Figures 26, 27:
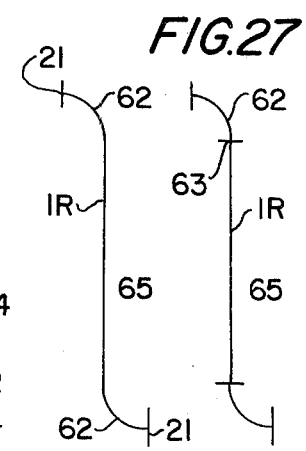

FIG. 24 illustrates an U-shaped expansion joint with only one extra flexible joint 3U, connected to the flexible joints 3 of the pipeline by means of S-shaped pipe elements shown without dead flanges in FIG. 26 and with dead flanges 63 in FIGS. 24 and 27.

Figure 25:
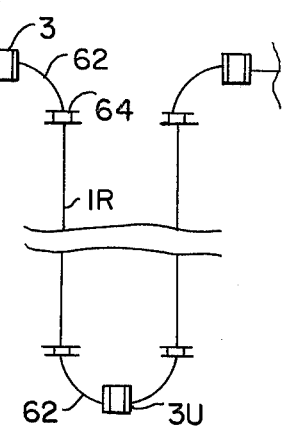

FIG. 25 shows the use of a simple rigid coupling 64 in the construction of a U-shaped joint in which a relatively inexpensive joint 64 replaces the more expensive flexible joints 3E of FIG. 23.

Coupling 64 is composed of two hexagon flanges like flanges 21 of FIGS. 9 and 15 connected by a sufficient length of a collar enabling bolt connection between the elbows 62 and the reduced length field unit 1R (without flexible joints) by said coupling 64.

FIG. 26 shows the simplest S-shaped pipe line element 65 composed of a weldment comprising flange 21, elbow 62, a reduced pipe and shell element 1R, another elbow 62, and flange 21.

FIG. 27 is similar to FIG. 26 except that dead flanges 63 (without bolt holes) are added at the ends of pipe 1R. These flanges 63 facilitate mutual positioning of the shells around pipe 65 of the S-shaped component and its elbows.

Figure 28:
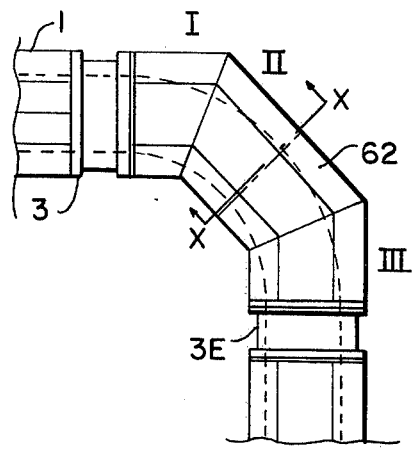
FIG. 28 illustrates more in detail the two flexible joints (for instance, of the left upper corner of FIG. 23) showing the end of a field unit, a flexible joint, an elbow, another flexible joint, and the end of another field unit.

FIG. 28 shows in some detail the entry end of the expansion joint as schematically shown in FIG. 23. It is evident that the angles forming the shell elbow element divide the 90° of the elbow in four equal parts (see FIG. 29). Should it be desired to build a shell for a 45° elbow, the hexagon flange would have to be placed at the line X—X of FIG. 28. (This is not for the expansion joint).

Figure 29:
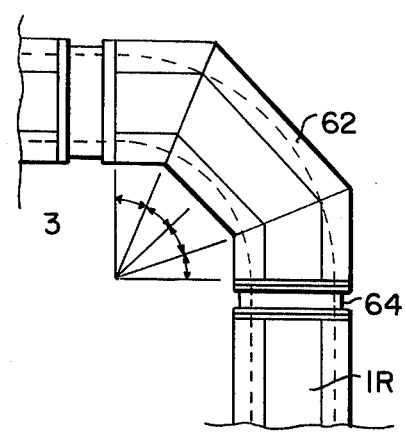
FIG. 29 is a view similar to that of FIG. 28 but representing the upper left corner of FIG. 25 showing the end of a field unit, a flexible joint, an elbow, a simple rigid coupling followed by the end of another field unit.

FIG. 29 shows more in detail the expansion joint according to the diagram of FIG. 25, in its upper left corner.

Figure 30:
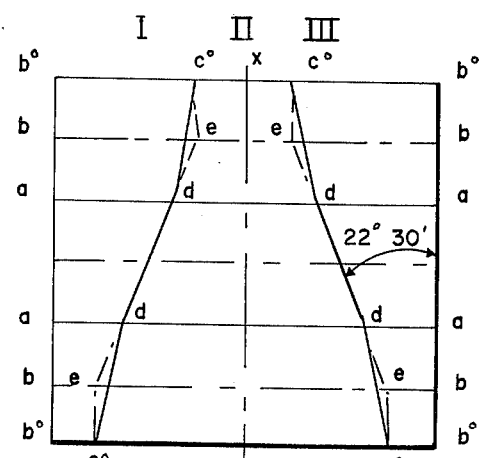
FIG. 30 illustrates the pattern of a rectangular sheet of metal said pattern being followed when making the shell elbows.
Figure 31:
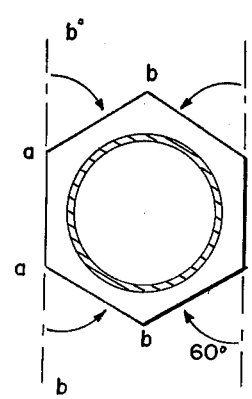
FIG. 31 illustrates the manner in which the sheet is bent into an upper and lower section of the shell elbow.

FIG. 30 shows the developed outline of the plate $b^o$-$b^o$-$b^o$-$b^o$ to be cut according to $c^o$-$d$-$d$-$c^o$, then folded at 60° according to lines $a$-$d$-$d$-$a$, the $b^o$ lines taking position b-b of FIG. 30 and forming the horizontal joints of the hexagon in FIG. 31, which is section XX of FIG. 28.

Thus portions I, II, and III of FIG. 30, when bent according to FIG. 31 (along lines $a$-$d$-$d$-$a$ of FIG. 30), will form parts I, II, and III of the shell elbow of FIGS. 28 and 29.

The shells of the pipeline elbows can be welded to at least one of their flanges or they can simply be put onto an hexagon outline band 66 which is welded to the flanges, the dimensions of this outline corresponding to the kink 61 described in FIG. 22.

Figure 32:
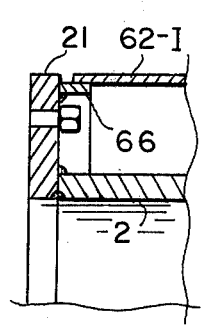
FIG. 32 shows a method of positioning the shell elbow or the straight shell on a band welded to the flange.

FIG. 32 shows a section through shell section part I of elbow 62, through band 66, and through flange 21 to which band 66 is welded. Pipe 2 is also welded to flange 61.

After placing the elbow shells around bands 66 (one on each flange 21) it is now possible to perform horizontal welding at the lines $b$—$b$ of FIG. 30 or at points $b$ of FIG. 31 and then to fill the hollow space between pipe elbow and the shell of the elbow with the foam material through appropriate holes (not shown).

It may be pointed out that the zig-zag arrangement as described hereinabove is not only used in the construction of the expansion joints but the entire pipeline may be laid in zig-zag fashion including rigid angles and no flexible joints at all.

As described hereinabove, the shells as shown in FIGS. 21 and 22 may have not only an inward kink but also, as shown in FIG. 22A, an outward kink. While the external appearance of the inwardly kinked shell of FIG. 22 has a smoother surface, the outwardly kinked shells of FIG. 22A have the advantage that they present a smoother surface within the shells so that the foam material inside the shells can slide more easily during expansion and contraction of the pipe and the shell body.

The following expressions have been used in the foregoing specification and denote the following parts of the pipeline assembly:

"Field Unit": The field unit 1 can be short or long. It comprises the weldment 2, the foam jacket, its protective shell, and the flexible joint. 1-S in the attached drawings represents the short field unit and 1-L the long the long field unit, while 1-W is the field unit 1 without the flexible joint 3.

"Weldment": The weldment comprises the weld pipes 4 of commercial length, the round flanges 6 or the hexagonal flanges 21, and the lifting ears, if any, but not the shell, nor the foam jacket.

"Flexible Joint": the assembled flexible joint is indicated in the drawings by the numeral 3.

"Pipe": The commercially available length of pipe is indicated in the drawings by the numeral 4.

"Pipe Elements": The pipe element 2A corresponds to weldment 2, but without flanges 6 or 21.

The following examples show the water lifting force and the buoyancy for a 48 inch oil pipeline according to the present invention. The buoyancy and water lifting force as well as the weight of the pipeline are calculated for a steel pipe of 1,220 mm. inner diameter and a wall thickness of 15 mm; a steel shell of 5 mm. thickness and an outer diameter of 1,600 mm. for a round shell and of 1,600 mm. for the plane parts of a hexagonal shell; an oil density of 0.95; and a foam density of 0.15. Thus the inner diameter of the pipe is 48 inches, its wall five-eighths inch thick, while the shell has an outer diameter or a plane dimension of the hexagon plane of 63 inches and a wall thickness of three-sixteenths inch.

| Round Shell: | | |
|---|---|---|
| Weight per m. of length: | Oil | 1,110.52 kg. |
| | Pipe proper | 456.85 kg. |
| | Foam | 113.76 kg. |
| | Shell | 196.68 kg. |
| | Total weight | 1,877.81 kg. |
| Water lifting force: | | 2,010.68 kg. |
| Resulting buoyancy | | 132.87 kg. |
| corresponding to about 7% of weight. | | |
| Hexagon Shell: | | |
| Weight per m. of length: | Oil | 1,110.52 kg. |
| | Pipe proper | 456.85 kg. |
| | Foam | 144.33 kg. |
| | Shell | 216.87 kg. |
| | Total weight | 1,928.57 kg. |
| | Reinforcements | 100.00 kg. |
| | Final total weight | 2,028.57 kg. |
| Water lifting force: | | 2,250.25 kg. |
| Resulting buoyancy | | 221.67 kg. |
| corresponding to about 11% of weight. | | |

According to another embodiment of the present invention it is not necessary to make the shell of several independent sections as described and illustrated, for instance, in FIGS. 21, 22, and 22A. The entire shell for each pipe unit can also be made of corrugated material; because due to the corrugations the shell will yield to the differences in temperature between pipe and shell without creating dangerous stresses. Such a construction will permit welding not only of the pipe to the flanges but also of the one piece-shell thereto, thus making completely water-tight the field unit of pipe and shell filled with foam. Of course, the shell of corrugated material may be of round cross-section or it may have a hexagon shape.

I claim:
1. A prefabricated field unit of assembled pipe elements comprising
   a plurality of assembled pipe elements arranged in longitudinal alignment thereby to form a self-supporting pipeline,
   a shell surrounding each pipe element and spaced therefrom, said shell being comprised of top and bottom shell sections welded at their adjoining faces to form an integral shell assembly, said bottom shell section having associated therewith means for supporting said pipe, said shell having an even number of walls which number at least six, and said top and bottom shell sections comprising trough and cover parts each of which has one half of the number of walls of the entire shell; said trough and cover parts being welded at their adjoining ends;
   foam plastic material within the space between said pipe and shell for heat insulating the pipe and creating buoyancy of the field unit, and
   a flexible joint extending between and fixedly attached to adjoining pipe elements.
2. The combination of claim 1 wherein said shell is hexagonal in shape and said top and bottom shell sections comprise half-hexagonal trough and cover parts welded at their adjoining ends.
3. The combination of claim 1 wherein said means for supporting said pipe in said bottom shell section comprises pipe support members rigidly secured to said bottom shell section for directly supporting said pipe.
4. The combination of claim 1 wherein said means for supporting said pipe comprise sliding support members mounted within said bottom shell section for supporting said pipe, the supporting engagement between the pipe and the support members being such as to permit relative movement therebetween.
5. The combination of claim 1 wherein said top shell section includes reinforcing members in the form of longitudinal and transverse beams rigidly secured to said top shell section, the latter enclosing but not being rigidly connected to said pipe thereby to permit movement therebetween caused by temperature changes.
6. The combination of claim 1 wherein certain of said pipe elements are provided with means enabling lifting of the assembled field unit.

* * * * *